Oct. 24, 1950     C. W. COCHRAN, JR     2,526,635

FUEL AIR RATIO INSTRUMENT

Filed Nov. 14, 1945

*INVENTOR.*
CHARLES W. COCHRAN JR

BY Ralph L Chappell

ATTORNEY.

Patented Oct. 24, 1950

2,526,635

UNITED STATES PATENT OFFICE 2,526,635

FUEL AIR RATIO INSTRUMENT

Charles W. Cochran, Jr., United States Navy,
Yeadon, Pa.

Application November 14, 1945, Serial No. 628,626

2 Claims. (Cl. 73—196)

(Granted under the act of March 3, 1883, as
amended April 30, 1928; 370 O. G. 757)

This invention is basically a novel fuel-air ratio instrument intended to maintain and indicate the fuel-air ratio of internal combustion engines. It can, however, also be used for fluid fuel and air ratio control of heating units such as oil burning heaters, furnaces, ovens, etc. A further use would be as a fluid ratio control and indicator in the chemical industry. Although fuel and air as supplied to an internal combustion engine are used herein as an example it is understood that any other desired fluids may be so controlled and indicated for other purposes and processes.

The operation of this instrument is based on the pressure drop resulting when a fluid flows through an orifice. This flow and pressure drop vary according to the relative pressure and viscosity of the fluids. By using a fixed orifice for one fluid and a variable orifice for the other the pressure relationship between these fluids can be maintained; therefore, the fluid flow ratio is proportionate to the area of the variable orifice. In this invention the area of the second orifice is varied by means of a poppet valve, thus the position of the poppet indicates the orifice area and the fluid ratio.

Furthermore, an instrument of this type can be used to calibrate the carburetors of existing automotive engines, and so adjust them for most efficient operation. This would be particularly useful in automobile service stations and airfield shops.

Being a self-contained unit this instrument permits, by means of regular tubing connections, of installation on existing aircraft engines. This would regulate their operation, increase their power efficiency by improved combustion and fuel economy, and consequently maintain them in cleaner operating condition and for longer periods between overhauls.

These and other objects of this invention will become more apparent from the following detailed description and the accompanying drawing which illustrates a typical embodiment of this invention.

Figure 1:
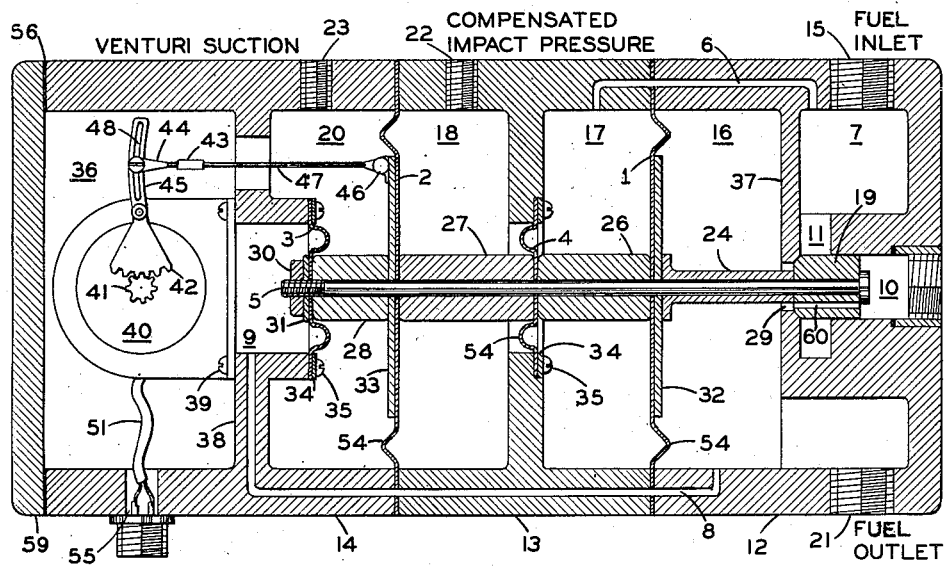
Fig. 1 is a longitudinal section view showing all the internal parts of the operating mechanism, the indicating mechanism actuating device, and the piping connections.
Figure 4:
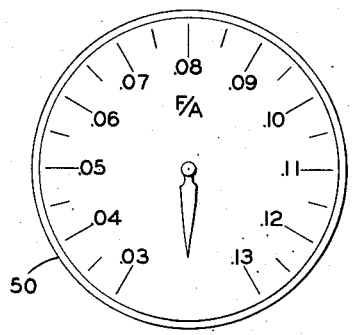
Fig. 4 is a face view showing the graduations on a typical indicating instrument dial.
Figure 2:
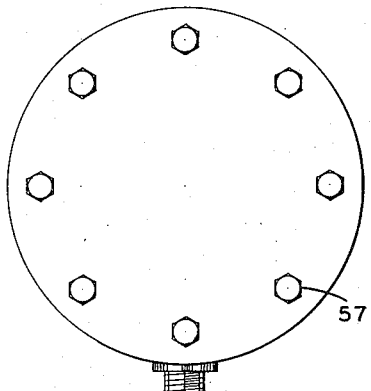
Fig. 2 is an outer end view indicating the cylindrical shape of the device, and its assembly bolts.
Figure 3:
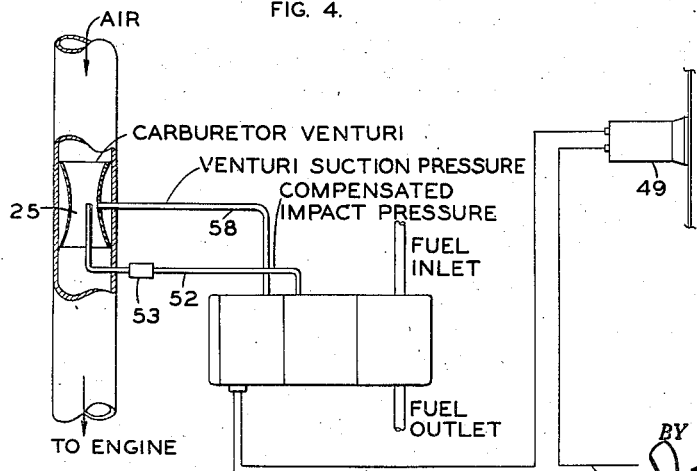
Fig. 3 is a diagrammatic view illustrating typical installation connections between the indicator, transmitter and carburetor.

Referring now to Fig. 1, it is seen that the principal components of this invention are a multi-section outer case 12, 13, 14, 59 divided into chambers 7, 9, 10, 16, 17, 18, 20, 36 by partitions 37, 38 and diaphragms 1, 2, 3, 4; a valve stem 5; and a poppet valve 19. The fuel enters through supply connection 15 into chamber 7 and then into annular duct 11 from which its further flow through port 29 is restricted by the movements of the poppet valve 19. However, fuel at maximum pressure entering through by-pass 6 into chamber 17 builds up a differential pressure under diaphragm 1 which tends to hold the poppet valve 19 open. The fuel in chamber 16 is at lower pressure and is free to flow out to the carburetor through discharge connection 21. Due to communicating by-pass 8, the pressure in chamber 9 is the same as in chamber 16 and diaphragms 3 and 4 balance each other approximately. All diaphragms act as seals between chambers.

The pressure through connection 22 in chamber 18 is the total or impact pressure of the other fluid passing through the fixed orifice 25. The pressure through connection 23 in chamber 20 is the suction or static pressure in the orifice 25. Therefore, the pressure differential on diaphragm 2 tends to close the poppet valve 19.

The pressures in chambers 10 and 16 are equalized through ports 60, thus preventing excessive dash pot effect.

As diaphragm 4 is balanced by diaphragm 3 and poppet valve 19 is balanced through port 60, then the only forces tending to open or close the poppet valve 19 are the pressure differentials across diaphragms 1 and 2. These differentials will operate the poppet valve 19 so as to balance diaphragm 1 against diaphragm 2.

The operation of the diaphragms 1, 2, 3, 4, is transmitted to the poppet valve 19 by a co-axial floating shaft 5. The diaphragms 1, 2, 3, 4, are securely held to the shaft 5 and properly spaced by means of cylindrical spacers 24, 26, 27, 28, washer 31 and nut 30. The large diaphragms 1 and 2 are backed up with retainer plates 32, 33. The large diaphragms 1 and 2 are clamped between the body sections 12, 13, 14. The small diaphragms 3 and 4 are secured by flat rings 34 and machine screws 35.

In chamber 36 secured to partition 38 by screws 39 is a commercial electrical autosyn position transmitter 40 but other equivalent means can be used instead. The movements of the poppet valve 19 are conveyed to transmitter 40 by shaft 5 and by means of linkage parts 43, 44, 45, 46, 47, and gears 41, 42. By means of quadrant slot 48 and turnbuckle 43 it is possible to make any required adjustments to get the initial reading on the commercial indicator 49 which has a specially graduated dial 50. These adjustments permit the same instrument to be used for various sizes of fixed orifices and various dial graduations.

The electric autosyn position transmitter 40 (equivalent to Pioneer #AY-6H) has regular electric wiring connections 51 through opening 55 to commercial position indicator 49.

The Venturi suction pressure line 58 connects from the carburetor venturi 25 to chamber 20.

The air impact pressure line 52 connects from center of carburetor venturi 25 as shown to chamber 18. It is provided with a "Sylphon" type compensating unit 53, which is necessary where a compressible fluid, such as air, is involved. This compensator is a type of pressure and temperature compensating device which is a part of the standard carburetor equipment. It forms no part of this invention. It comprises a two interconnected chambered device, one the impact chamber and the other containing a bellows filled with a combination of a liquid and a vapor. The combination is sensitive to fluctuations in pressure and temperature, and causes the bellows to expand or contract with these fluctuations. The bellows operates a stem bleed valve from the impact chamber to the atmosphere. By proper adjustment this compensator compensates the impact air pressure so that air flow by weight is indicated rather than volume flow.

All diaphragms have one or more corrugations 54 to permit free movements.

A removable plate 59 covers the transmitter chamber 36.

Suitable sealing gaskets 56 will be provided at all section connections. Through bolts 57, tie all sections 12, 13, 14, 59, together.

In operation this instrument does not set or maintain a fuel-air ratio. It indicates fuel-air ratio. The metering suction pressure differential across the venturi of the carburetor of an aircraft engine is constantly changing because of fluctuation in air currents, plane speed, throttle setting, etc. Therefore, the pressure differential across diaphragm 2 is always fluctuating and moving valve 19 back and forth, always maintaining the fuel pressure differential across diaphragm 1 equal to the air pressure differential across diaphragm 2. Variation in fuel pressure does not affect this reading as fuel-pressure differential is used.

The design permits of manufacture in any size desired, to any practical pressure requirements, and of materials suitable for the fluids controlled. Furthermore, the operation is not affected by changes in inclination, vehicle motions or by gravitation. It is equally suitable for operational use on planes and test service on automotive engines. Being fully automatic within its adjustment range it will function dependably at the selected setting, requiring no further manual operation.

From the foregoing description it will be apparent that the present invention provides a novel and improved means of ratio control and indication for fluids such as air and automotive fuels, chemical fluid mixtures, and liquid fuels for heating and general industrial use. The device being entirely foolproof, can be adjusted by experienced personnel and then used automatically or by unskilled labor with equally good results.

Furthermore, the invention provides a novel device with the described features and operating characteristics and of a durable design and substantially easy and inexpensive to manufacture.

While a particular embodiment of the present invention has been shown and described herein, it is not intended to limit the invention to such disclosure, and changes and modifications may be made therein and thereto within the scope of the claims.

The invention described herein may be manufactured and used by or for the Government of the United States of America for governmental purposes without the payment of any royalties thereon or therefor.

I claim:

1. Apparatus for indicating the proportional delivery of fluids in two fluid lines, comprising a casing, first and second aligned compartments in said casing, a diaphragm in each compartment dividing it into two adjoining chambers, means connected to said diaphragms for movement as a unit, a single admission valve for said second compartment having connection to one of said fluid lines, said valve being mechanically connected to said means and movable therewith to open and closed positions, both chambers of said second compartment adjoining said valve being connected by passage ways to the inlet side of said valve, ports connecting each of the chambers in said first compartment to differential pressure points in the other of said fluid lines, and means responsive to the displacement of said valve, to indicate a ratio of the flow of said fluid.

2. Apparatus for indicating the proportional delivery of fluids in two fluid lines, comprising a casing, first and second aligned compartments in said casing, a main diaphragm in each compartment dividing it into two adjoining chambers, a single admission valve for said second compartment having connection to one of said fluid lines, a movable element attached to each of said main diaphragms and said valve, support diaphragms mounted in the compartment walls for supporting said element for movement whereby said valve is adjusted to open and closed positions, both chambers of said second compartment adjoining said valve being connected by passageways to the inlet side of said valve, ports connecting each of the chambers in said first compartment to differential points in the other of said fluid lines, and means responsive to the displacement of said valve to indicate a ratio of flow of said fluid.

CHARLES W. COCHRAN, Jr.

REFERENCES CITED

The following references are of record in the file of this patent:

UNITED STATES PATENTS

| Number | Name | Date |
| --- | --- | --- |
| 1,308,626 | Crowell | July 1, 1919 |
| 1,333,986 | Lundgaard | Mar. 16, 1920 |
| 1,363,513 | Keith | Dec. 28, 1920 |
| 1,921,145 | Albright | Aug. 8, 1933 |
| 2,074,882 | Wunsch | Mar. 23, 1937 |
| 2,143,820 | Payn | Jan. 10, 1939 |
| 2,217,641 | Junkins | Oct. 8, 1940 |
| 2,217,642 | Luhrs | Oct. 8, 1940 |
| 2,382,625 | Garretson | Aug. 14, 1945 |

FOREIGN PATENTS

| Number | Country | Date |
| --- | --- | --- |
| 490,607 | Great Britain | Aug. 17, 1938 |